Figures 1, 2:
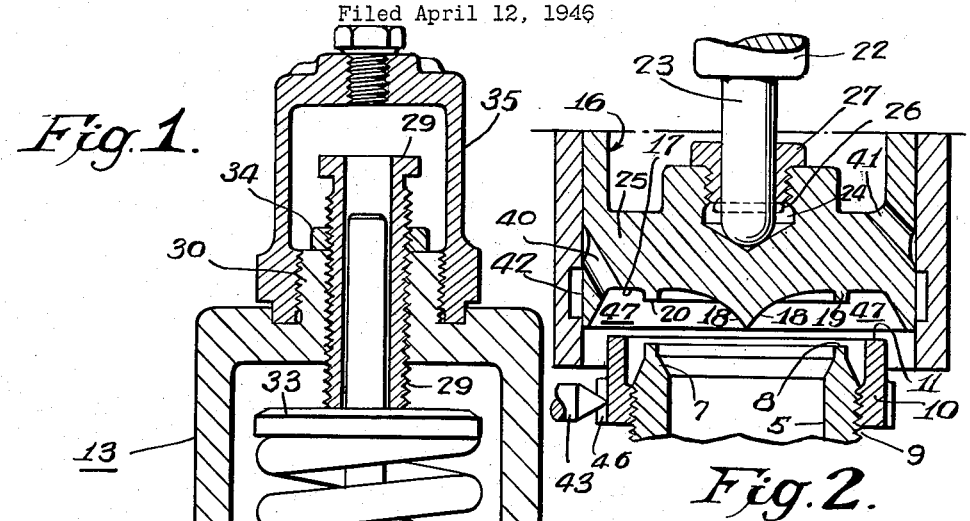

May 20, 1952    T. W. BERGQUIST    2,597,057
SAFETY VALVE
Filed April 12, 1946

Inventor:-
Theodore Bergquist
by his Attorneys
Howson & Howson

Patented May 20, 1952

2,597,057

UNITED STATES PATENT OFFICE 2,597,057

SAFETY VALVE

Theodore W. Bergquist, Willow Grove, Pa., assignor to J. E. Lonergan Company, Philadelphia, Pa., a corporation of Pennsylvania Application April 12, 1946, Serial No. 661,709

2 Claims. (Cl. 137—53)

This invention relates to new and useful improvements in valves, and more particularly to safety valves for the protection of vessels and systems containing gases, vapors and other fluids under pressure.

Prior to the present invention the practice in respect to safety valves of the stated type has been to provide valves having a lift of considerable extent and the attainment of high capacity with the usually required "blow down" or pressure drop of about four per cent to effect reclosing of the valve. However, as the capacity of any given size of valve is increased, the ability to control the valve action is made more difficult with the result that instabilities such as flutter, long "blow down," undue simmer and drag, which manifests itself when the valve fails to close sharply and tight, are undesirable characteristics which are considered inherent in conventional safety valve design.

Various arrangements have been proposed heretofore to control the "blow down" or pressure drop below the four per cent usually required in valves of this type without inducing the foregoing undesirable operating characteristics of the valve. Thus, arrangements have been proposed to utilize pressure in the popping chamber to assist in reclosing the valve, for example, by varying the orifice size so as to regulate the rate of fluid flow to the upper chamber of the valve disk, or by utilizing an orifice of predetermined size to admit the proper amount of fluid to create the required back-pressure. These proposed arrangements, all of which involved regulation of the amount of fluid admitted above the valve disk, proved undesirable for the reasons that (1) no provision was made for cut-off of the flow of fluid to the upper chamber of the disk thereby producing a continuing back-pressure when the valve is in the open position and reducing both the lift of the disk and rate of flow through the valve, (2) large over-pressures tend to build up the back pressure in the upper chamber to which fluid is constantly admitted thereby limiting the lift and in turn reducing the rate of discharge so that the pressure in the system or vessel continues to increase and ultimately reaches the danger point with accompanying possibility of rupturing the system or vessel, (3) such fixed orifice type of valves present manufacturing problems due to the difficulty in maintaining uniform leakage past the valve guide and disk and, (4) no provision exists for eliminating "crawl" of the valve under the conditions of very low "blow down."

With the foregoing in mind, the principal object of the present invention is to provide a safety valve of the type set forth wherein the aforementioned difficulties and undesirable characteristics are eliminated.

Another object of the invention is to provide a safety valve of the stated character embodying novel features of construction and operation whereby the "blow down" or pressure drop required to reclose the valve is effectively controlled and maintained below four per cent.

Another object of the invention is to provide a novel safety valve of the type described wherein a portion of the static pressure existing in the popping chamber is utilized to effect a sharp or abrupt reclosing of the valve under all conditions of "blow down."

Another object of the invention is to provide a novel safety valve of the character set forth wherein the reclosing cycle of the valve may be repeated indefinitely free from "crawl" or, in other words, without reclosing at a successively higher pressure on each cycle than the pressure for which the valve is set to operate.

A further object of the invention is to provide a novel safety valve having the features and characteristics set forth which is of relatively simplified and inexpensive construction, and which is highly foolproof and efficient in operation and use.

These and other objects of the invention, and the various features and details of the construction and operation thereof are hereinafter fully set forth and described with reference to the accompanying drawings; in which:

Fig. 1 is a sectional view vertically through a valve made according to the present invention and showing the valve element and associated parts in their closed positions; and Fig. 2 is an enlarged fragmentary sectional view showing the valve element and associated parts in their open positions.

Referring now to the drawing, a valve made according to the present invention comprises a valve body 1 in which is formed a main chamber 2, an inlet duct 3 and an outlet or discharge duct 4. The outlet duct 4 is in direct communication with the main chamber 2 while the inlet duct 3 has communication with the main chamber 2 only through a hollow inwardly tapered nozzle 5, which is threaded in said inlet duct 3 as indicated at 6, and constitutes the primary orifice of the valve. The inner end of the nozzle 5 is provided with an annular axial extension 7 having a flat circular end face 8 which is disposed in a plane at right angles to the axis of the nozzle 5 and constitutes the seat of the valve.

Below the axial extension 7 the nozzle 5 is externally threaded as at 9 to receive internal threads of an adjustable warn ring 10. The ring 10 is provided with a flat annular end face 11 which like the valve seat 8 likewise is disposed at right angles to the axis of the nozzle 5 and is adapted for adjustment to various positions parallel to the surface of the valve seat 8 axially of the nozzle 5.

Suitably secured upon the valve body 1, for example, by means of bolts or the like 12 is a substantially cylindrical housing 13, and clamped between the adjacent faces of said body 1 and housing 13 is an annular flange portion 14 which is provided at the upper end of a cylindrical guide sleeve 15 that extends downwardly within the valve chamber 2 coaxially with respect to the inlet nozzle 5. The guide sleeve 15 is of greater diameter than the inner end portion of the nozzle 5 and the length of said sleeve is such that its inner end terminates at a level a short distance below the level of the valve seat 8.

Slidably mounted within the guide sleeve 15 for axial movement in opposite directions therein is a valve piston 16 which is provided with a substantially flat end face 17 disposed in a plane substantially at right angles to the axes of said piston 16 and the surrounding guide sleeve 15. In the center of the end face 17 of the piston 16 is a downwardly projecting spreader cone 18 by which fluid impinging against the piston face 17 is directed radially outward in all directions toward an annular rib 19 formed on said face 17 concentric to the axis of the piston 16 (see Fig. 2). The rib 19 is provided with a flat circular face 20 of substantially the same inside and outside diameter as the valve seat 8 against which the said face 20 is adapted to bear to close off the flow of pressure fluid from the bore of the nozzle 5 into the valve chamber 2.

The piston seating surface 20 normally is maintained in contact with the valve seat 8 by a loading spring 21 which is housed within the housing 13. The piston 16 is provided with a suitable stem 22 having one end 23 thereof rounded and seated in an internal recess 24 formed in the solid end portion of the head 25 of the piston 16. The piston stem or rod 22 is provided with radially extending pins 26 which extend into the recess 24 below the lower end of a suitable nut 27 threaded therein. The piston stem or rod 22 projects from the piston head 25 axially through the hollow body or chamber 28 of the piston, the guide sleeve 15, and into and through the housing 13. The other end of the rod or stem 22 is slidably mounted in an axial bore formed in an adjusting screw 29 which is threaded into a hub or boss 30 formed at and closing the upper end of the spring housing 13.

Mounted on and resting against an annular shoulder 31 on the stem 22 within the housing 13 is a spring abutment washer 32 against which bears one end of the loading spring 21, the opposite end of said spring bearing against a loose abutment washer 33 slidably mounted on the stem 22 and resting against the inner end of the adjusting screw 29. The loading spring 21 may be set to any desired popping pressure of the valve by proper adjustment of the screw 29, and the screw is secured in its tightened position by means of a lock nut or the like 34. A cap 35 covers the adjusting screw and its lock nut, and is removably threaded onto the exterior of the central boss 30 in which the adjusting screw 29 is mounted.

In accordance with the present invention there is provided radially through the guide sleeve 15 adjacent the upper end thereof, a back pressure port 36 which is so positioned lengthwise of said sleeve 15 with respect to the axial length of the piston 16 that said port 36 will remain open at all times and is not closed by the piston 16 when the latter is actuated into its fully open position with respect to the valve seat 8. In addition, there is also provided laterally through the guide sleeve 15 a stabilizer vent 37 which is positioned just above the upper end of the piston 16 in the relation shown so that said vent 37 is fully opened when the piston 16 is closed upon the valve seat 8 and is closed by said piston as the latter moves from said closed position to the full open position thereof with respect to said valve seat 8, for example, in the relation shown in Fig. 2 of the drawing.

Means are provided to vary the flow area through the port 36 in the guide sleeve 15 to thereby control back pressure internally of the chamber 28 of the piston 16 and the guide sleeve 15, and this may be accomplished effectively by means of a threaded plug or the like 38 which is mounted for adjustment coaxially toward and away from said port 36 within an internally threaded bore 39 provided in the valve body 1.

Formed in the head 25 of the piston 16 is one or more ports or passages 40 that lead from the piston end face 17 inwardly through said piston head 25 and open outwardly through the side wall of the piston 16, as shown. In addition to the ports 40, there is also provided in the piston head 25 one or more ports or passages 41 that lead from the piston side wall inwardly through said head 25 and open into the internal chamber 28 of said piston 16. These ports or passages 40 and 41 are staggered or alternately positioned with respect to one another circumferentially of the piston 16 and are further staggered or offset with respect to one another in a direction axially of the piston, for example, so that the openings of both ports 40 and 41 in the piston side wall are disposed in the same plane transversely of the axis of said piston 16.

Communication between the openings of the ports 40 and 41 in the side wall of the piston 16 is provided by a continuous annular channel or recess 42 which is formed in the internal wall surface of the guide sleeve 15, and the arrangement of said channel 42 and the ports 40 and 41 is such as to establish and provide communication therethrough from the valve main chamber 2 to the piston chamber 28 and the interior of the guide sleeve during opening and closing movement of the piston 16 with respect to the valve seat 8, and to close-off or preclude flow therethrough from chamber 2 to the piston chamber 28 when the piston 16 is in the full open position.

In the illustrated embodiment of the invention, the arrangement of the channel 42 and ports 40 and 41 is such that they are also open to permit flow therethrough from chamber 2 to the piston chamber 28 and interiorly of the sleeve 15 when the piston 16 is in the full closed position upon the valve seat 8, but this is not essential and the sole requirements for effective operation of the valve according to the present invention are that the ports 40 and 41 be open and in communication to permit flow therethrough during travel of the piston between full closed and full open positions, and that said ports 40 and 41 be closed to preclude flow in said full open position of the piston.

Preparatory to operation of the valve shown in the drawing, the loading spring 21 is "set," by adjusting the screw 29, to any desired pressure at which the valve is to "pop" or blow-off, i. e. the pressure at which the piston 16 will be actuated upwardly slightly from its fully closed position thereby displacing the piston face 20 from the valve seat 8. The warn ring 10 also is adjusted axially of the nozzle 5 to provide the proper "pop'" action effect by exposing an enlarged area of the piston 16 to the pressure of the fluid. The ring 10 may be secured in the position to which adjusted by a pin 43 which has an enlarged outer end 44 threaded into and through the valve body 1, and a pointed inner end 45 engaging longitudinal flutes or the like 46 in the lower portion of the periphery of the said ring 10.

In accordance with the invention, attainment of the stated objectives and elimination of the difficulties and undesirable characteristics encountered in prior valves of the present type, is accomplished by utilizing a portion of the static pressure in the piston chamber 28 and sleeve 15 to augment the force of the spring 21 at a predetermined position of the piston 16 and effect a sharp and abrupt closure of said piston 16 upon the valve seat 8 under any required condition of blow-down and without "crawl".

In operation of the embodiment of the valve shown in the drawing, when the pressure of fluid in the nozzle 5 reaches the "set" load pressure of the spring 21 the resulting "pop" action of the valve causes the piston 16 to rise to full open position thereby forming between the nozzle 5 and piston 25 a chamber 47 having a stricture or opening between the piston and warn ring 10 to the valve main chamber 2, the said stricture or opening being designed and constructed so that there is maintained within the chamber 47 a predetermined pressure considerably in excess of the pressure existing in the valve main chamber 2. Returning to the operation of the valve, the aforesaid "pop" action which takes place causes the piston 16 to rise to full open position so rapidly that no appreciable amount of fluid entering chamber 47 from the nozzle 5 will enter the piston chamber 28 through ports 40 and 41 and channel 42, and hence no appreciable back-pressure exists in said chamber 28 on the opening stroke of the cycle due to the fact that flow through said ports 40 and 41 and channel 42 is shut-off in the full open position of the piston 16. However, a slight reduction in the fluid pressure in the inlet nozzle 5 acting on the end face 17 of the piston allows the latter to move downwardly thereby establishing communication between the ports 40 and 41 so that pressure fluid from the chamber 47 is admitted to the piston chamber 28.

The amount of back pressure built-up in the piston chamber 28 as the result of pressure fluid admitted thereto from the valve chamber 47 through ports 40 and 41 is controlled by adjustment of the plug 38 to increase or decrease the flow area through the port or bleed orifice 36. Thus, by restricting the port or orifice 36, by adjustment of the plug 38, to the proper degree the magnitude of the pressure within the piston chamber 28 may be increased to the value desired to augment the force of the spring 21 and effect a reclosing of the piston 16 upon the valve seat 8.

It is to be noted that as the flow area through the port or orifice 36 is further restricted by adjustment of the plug 38, the magnitude of the pressure within the piston chamber 28 will progressively increase and, in practice, the pressure within the piston chamber 28 is regulated to effect opening and closing of the piston with respect to the valve seat 8 in response to extremely small differences in the pressure of the fluid entering the valve through the nozzle.

Operation in this manner whereby the piston is caused to open and close in response to an extremely small pressure differential, is what is known as a condition of extremely low blowdown and when the orifice 36 is restricted by the plug 38 to the extent required to produce such operating condition, the restricted area of the orifice 36 generally is insufficient to vent and completely dissipate the pressure within the piston chamber 28 rapidly enough when the piston 16 recloses upon the valve seat 8 with the result that the combined force of this unvented pressure and the spring force must be overcome before the piston 16 will again rise or open with respect to said valve seat 8 thereby producing the undesirable condition known as "crawl" wherein the piston 16 opens at a pressure greater than that for which the valve is set.

This condition of "crawl" is effectively eliminated in the present invention by the vent port 37 which is arranged in said sleeve 15 in the manner described so as to open fully the instant the piston 16 returns to the closed position upon the valve seat 8. The combined areas of the restricted orifice 36 and the vent port 37 are sufficient to effect a complete dissipation of the pressure within the piston chamber 28 as soon as the valve piston 16 reseats upon the face 8 so that the sole force opposing reopening of the valve is the spring 21 and hence the valve will again open at the pressure for which it was originally set.

From the foregoing description it will be apparent that the present invention provides a novel safety valve which is operable under conditions of very low "blown down" entirely free from "crawl." The invention also provides a novel safety valve which is operable as described and is characterized by its relatively simplified and inexpensive construction and is highly foolproof and efficient in operation and use.

While a particular embodiment of the invention has been illustrated and described herein, it is not intended to limit the invention to such disclosure and changes and modifications may be made therein and thereto within the scope of the claims.

I claim:

1. A pressure relief valve comprising a valve body having a main chamber and a valve seat surrounding the inlet opening thereto, a piston movable coaxially with respect to said valve seat into and out of valve closing engagement therewith, tubular guide means for said piston defining therewith a substantially closed chamber at the opposite side of said piston from said valve seat, said guide means having in its inner surface a recess extending circumferentially of piston adjacent said valve seat, said piston having passages therein communicating respectively between said main chamber and said recess and between the latter and said closed chamber to provide communication between said main chamber and the closed chamber only during travel of said piston between closed and open positions thereof with respect to said valve seat and to shut off communication between said main chamber and closed chamber when said piston reaches said open position, and said guide means having therein a first port arranged so that it is open in all positions of the piston and a second port located in the wall of the guide means immediately adjacent the said opposite side of the piston in the closed position thereof and providing communication between said closed chamber and the main chamber in the closed position only of said piston.

2. A pressure relief valve comprising a valve body having a main chamber and a valve seat surrounding the inlet opening thereto, a piston movable coaxially with respect to said valve seat into and out of valve closing engagement therewith, tubular guide means for said piston defining therewith a substantially closed chamber at the opposite side of said piston from said valve seat, said guide means having in its inner surface a recess extending circumferentially of piston adjacent said valve seat, said piston having passages therein communicating respectively between said main chamber and said recess and between the latter and said closed chamber to provide communication between said main chamber and the closed chamber only during travel of said piston between closed and open positions thereof with respect to said valve seat and to shut off communication between said main chamber and closed chamber when said piston reaches said open position, and said guide means having therein a first port arranged so that it is open in all positions of the piston and a second port located in the wall of the guide means immediately adjacent the said opposite side of the piston in the closed position thereof and providing communication between said closed chamber and the main chamber in the closed position only of said piston, and means operable to regulate the flow area through said first port.

THEODORE W. BERGQUIST.

REFERENCES CITED

The following references are of record in the file of this patent:

UNITED STATES PATENTS

| Number | Name | Date |
| --- | --- | --- |
| 306,208 | Ashton | Oct. 7, 1884 |
| 1,952,646 | Ackermann | Mar. 27, 1934 |
| 2,035,129 | Hopkins | Mar. 24, 1936 |
| 2,165,611 | Campbell | July 11, 1939 |
| 2,345,389 | Falls | Mar. 28, 1944 |
| 2,501,730 | McClure | Mar. 28, 1950 |